(12) United States Patent
Jung et al.

(10) Patent No.: US 10,211,878 B2
(45) Date of Patent: Feb. 19, 2019

(54) UNIFIED COMMUNICATIONS APPARATUS

(71) Applicant: Samsung Electro-Mechanics Co., Ltd., Suwon-si (KR)

(72) Inventors: Seung Pil Jung, Suwon-si (KR); Da Un Kim, Suwon-si (KR); Young Sik Jeon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 7 days.

(21) Appl. No.: 15/456,123

(22) Filed: Mar. 10, 2017

(65) Prior Publication Data

US 2018/0062693 A1 Mar. 1, 2018

(30) Foreign Application Priority Data

Aug. 26, 2016 (KR) .......................... 10-2016-0109342

(51) Int. Cl.
*H04B 1/04* (2006.01)
*H04B 1/44* (2006.01)
*H04B 1/48* (2006.01)
*H04L 5/14* (2006.01)
*H04W 88/06* (2009.01)

(52) U.S. Cl.
CPC ................. *H04B 1/48* (2013.01); *H04L 5/14* (2013.01); *H04W 88/06* (2013.01); *H04B 1/44* (2013.01); *H04B 2001/0408* (2013.01)

(58) Field of Classification Search
CPC ........ H04B 1/44; H04B 1/406; H04B 1/0064; H04B 1/48; H04B 1/52; H04B 2001/0408; H04L 5/14; H04W 88/06
See application file for complete search history.

(56) References Cited

U.S. PATENT DOCUMENTS

| 8,139,670 | B1* | 3/2012 | Son | H04B 7/0413 |
| | | | | 370/334 |
| 8,467,738 | B2* | 6/2013 | Gorbachov | H01P 1/213 |
| | | | | 455/73 |
| 2005/0181847 | A1* | 8/2005 | Boyle | H03H 7/46 |
| | | | | 455/575.7 |
| 2011/0003563 | A1* | 1/2011 | Gorbachov | H01Q 21/0025 |
| | | | | 455/78 |

(Continued)

FOREIGN PATENT DOCUMENTS

KR 10-2012-0017011 A 2/2012
KR 10-1341509 B1 12/2013

*Primary Examiner* — Charles N Appiah
*Assistant Examiner* — Margaret G Mastrodonato
(74) *Attorney, Agent, or Firm* — NSIP Law (57) ABSTRACT

A communications apparatus includes: a communications IC including a first RF pin, a second RF pin, and a third RF pin; a first front-end module connected between the first RF pin and a first RF terminal to provide a first signal path for wireless Tx and Rx, a second signal path for a first wireless LAN Rx, and a third signal path for a first wireless LAN Tx; a second front-end module connected between the third RF pin and a second RF terminal to provide a fourth signal path for a second wireless LAN Tx and a fifth signal path for a second wireless LAN Rx; and a duplexer configured to provide a first wireless LAN Tx signal to the first front-end module through the second RF pin, and provide a second wireless LAN Tx signal to the second front-end module through the second RF pin.

12 Claims, 5 Drawing Sheets

(56) References Cited

U.S. PATENT DOCUMENTS

| | | | |
|---|---|---|---|
| 2012/0044919 A1 | 2/2012 | Medapalli et al. | |
| 2012/0322502 A1* | 12/2012 | Song | H04W 36/14 455/553.1 |
| 2013/0028147 A1* | 1/2013 | Black | H04B 1/109 370/277 |
| 2014/0170990 A1* | 6/2014 | Black | H04B 1/401 455/73 |
| 2014/0194072 A1* | 7/2014 | Mach | H04B 1/0458 455/73 |
| 2016/0105299 A1* | 4/2016 | Chee | H04L 27/0002 375/297 |
| 2017/0373730 A1* | 12/2017 | Pehlke | H04B 7/0404 |

* cited by examiner

UNIFIED COMMUNICATIONS APPARATUS

CROSS-REFERENCE TO RELATED APPLICATIONS

This application claims the benefit under 35 USC 119(a) of Korean Patent Application No. 10-2016-0109342 filed on Aug. 26, 2016 in the Korean Intellectual Property Office, the entire disclosure of which is incorporated herein by reference for all purposes.

BACKGROUND

1. Field

The following description relates to a unified communications apparatus capable of supporting wireless LAN (e.g., Wi-Fi) communications and Bluetooth™ communications.

2. Description of Related Art

As the market for premium smartphones has recently become saturated, interest in mid-to-low priced smartphones and the capabilities thereof has gradually increased. A product of a certain company may be used as an application processor (AP) for mid-to-low priced smartphones, and one example of a connectivity solution corresponding to an AP produced by that company is the 'WCN3680B' AP.

For example, the 'WCN3680B' AP includes an internal power amplifier (iPA) and an internal low noise amplifier (iLNA) being used at 2.4 GHz. However, iPAs and iLNAs may not satisfy a receiving sensitivity specification of high specification devices since structures of iPAs and iLNAs do not transmit a required output.

Accordingly, a certain circuit used with 'WCN3680B' employs a structure in which an external power amplifier (ePA) is used on a 2.4 GHz transmission (Tx) while an external low noise amplifier (eLNA) is used on a 2.4 GHz (Rx) path, in order to satisfy the required specification without changing a structure of an integrated circuit (IC). In this case, the 'WCN3680B' AP is designed so that both Bluetooth™ Tx/Rx signals and Wi-Fi Tx/Rx signals use a single RF pin, in order to reduce a number of IC pins.

However, as described above, when a unified communications module using an 'WCN3680B' AP employs a structure in which an ePA is used on a 2.4 GHz transmission (Tx) path while an eLNA is used on a 2.4 GHz reception (Rx) path, the unified communications module does not simply have an ePA/external low noise amplifier eLNA added thereto, but further employs two switch ICs. In this case, one switch IC is required to select one of Bluetooth™ Tx/Rx and Wi-Fi Rx of 2.4 G, while another switch IC is required to select one of Wi-Fi Tx of 2.4 G and Wi-Fi Tx of 5 G.

Specifically, the unified communications module is configured to use an RF pin (5 G/DA) from which a 2.4 GHz Tx signal and a 5 GHz Tx signal are output, in order to utilize an ePA without changing an IC structure. For this reason, in order to divide the 2.4 GHz Tx signal and the 5 GHz Tx signal, one switch IC is further used. In addition, in order to form a path through which a Bluetooth signal passes when the eLNA is used, another switch IC (switch 2) is further used.

As such, in the case in which the unified communications module separately includes the two switch ICs, the material cost may rise accordingly in a device intended for the important middle-low price market. In addition, since the two switch ICs and four control signal lines for controlling the switch ICs are further added, and an additional structure for shielding the control signal lines is required, the complexity of a circuit is further increased, by which complexity of wirings may be increased and a size of the module may be increased at the time of designing a product.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a communications apparatus includes: an integrated chip (IC) including a first radio frequency (RF) pin configured to execute wireless transmission (Tx) and reception (Rx), and a first wireless local area network (LAN) Rx, a second RF pin configured to execute a first wireless LAN Tx and a second wireless LAN Tx, and a third RF pin configured to execute a second wireless LAN Rx; a first front-end module connected between the first RF pin and a first RF terminal to provide a first signal path for the wireless Tx and Rx, a second signal path for the first wireless LAN Rx, and a third signal path for the first wireless LAN Tx; a second front-end module connected between the third RF pin and a second RF terminal to provide a fourth signal path for the second wireless LAN Tx and a fifth signal path for the second wireless LAN Rx; and a duplexer configured to provide a first wireless LAN Tx signal to the first front-end module through the second RF pin, and provide a second wireless LAN Tx signal to the second front-end module through the second RF pin.

The communications apparatus may further include a switch IC configured to selectively connect the first RF pin to one of the first signal path and the second signal path, in response to a control signal.

The first front-end module may include: a first low noise amplifier disposed on the second signal path and configured to amplify a first wireless LAN Rx signal to provide the amplified first wireless LAN Rx signal to the switch IC; a first power amplifier, disposed on the third signal path, and configured to amplify the first wireless LAN Tx signal provided by the duplexer; and a first switch circuit configured to selectively connect one of a first selection terminal connected to the first signal path, a second selection terminal connected to an input terminal of the first low noise amplifier, and a third selection terminal connected to an output terminal of the first power amplifier to a common terminal connected to the first RF terminal.

The second front-end module may include: a second low noise amplifier disposed on the fifth signal path and configured to amplify the second wireless LAN Tx signal from the duplexer; a second power amplifier disposed on the fourth signal path and configured to amplify the second wireless LAN Rx signal using the second RF terminal to provide the amplified second wireless LAN Rx signal to the third RF pin; and a second switch circuit configured to selectively connect one of a first selection terminal connected to an output terminal of the second low noise amplifier and a second selection terminal connected to an input terminal of the second power amplifier to a common terminal connected to the second RF terminal.

The first front-end module may include: a first low noise amplifier disposed on the second signal path and configured to amplify a first wireless LAN Rx signal to provide the amplified first wireless LAN Rx signal to the first RF pin; a first switch disposed in parallel with the first low noise amplifier and connected between an input terminal and an output terminal of the first low noise amplifier to provide the first signal path for the wireless Tx and Rx in an ON state; a first power amplifier disposed on the third signal path and configured to amplify the first wireless LAN Tx signal from the duplexer; and a first switch circuit configured to selectively connect one of a first selection terminal connected to a connection node between the first signal path and the second signal path, and a second selection terminal connected to an output terminal of the first power amplifier to a common terminal connected to the first RF terminal.

The second front-end module may include: a second power amplifier disposed on the fourth signal path and configured to amplify the second wireless LAN Tx signal from the duplexer; a second low noise amplifier disposed on the fifth signal path and configured to amplify the second wireless LAN Rx signal using the second RF terminal to provide the amplified second wireless LAN Rx signal to the third RF pin; and a second switch circuit configured selectively connect one of a first selection terminal connected to an output terminal of the second low noise amplifier and a second selection terminal connected to an input terminal of the second power amplifier to a common terminal connected to the second RF terminal.

In another general aspect, a communications apparatus includes: an integrated chip (IC) including a first radio frequency (RF) pin configured to execute wireless transmission (Tx) and reception (Rx), and a first wireless LAN Rx, a second RF pin configured to execute a first wireless LAN Tx and a second wireless LAN Tx, and a third RF pin configured to execute a second wireless LAN Rx; a first front-end module configured to provide, between the first RF pin and a first RF terminal, a first signal path for the wireless Tx and Rx, a second signal path for amplifying a first wireless LAN Rx signal from the first RF terminal to provide the amplified first wireless LAN Rx signal to the first RF pin, and a third signal path for amplifying a first wireless LAN Tx signal; a second front-end module connected between the third RF pin and a second RF terminal to provide a fourth signal path for the second wireless LAN Tx and a fifth signal path to amplify a second wireless LAN Rx signal from the second RF terminal to provide the amplified second wireless LAN Rx signal to the third RF pin; and a duplexer configured to provide the first wireless LAN Tx signal to the first front-end module through the second RF pin, and provide the second wireless LAN Tx signal to the second front-end module through the second RF pin, wherein the first front-end module is configured to amplify the first wireless LAN Tx signal provided by the duplexer through the third signal path to provide the amplified first wireless LAN Tx signal to the first RF terminal, and the second front-end module is configured to amplify the second wireless LAN Tx signal from the duplexer through the fourth signal path to provide the amplified second wireless LAN Tx signal to the second RF terminal.

The first front-end module may include: a first low noise amplifier disposed on the second signal path and configured to amplify a first wireless LAN Rx signal to provide the amplified first wireless LAN Rx signal to the first RF pin; a first switch connected to the first low noise amplifier in parallel between an input terminal and an output terminal of the first low noise amplifier to provide the first signal path for the wireless Tx and Rx in an ON state; a first power amplifier, disposed on the third signal path and configured to amplify the first wireless LAN Tx signal from the duplexer; and a first switch circuit configured to selectively connect one of a first selection terminal connected to the first signal path, a second selection terminal connected to an input terminal of the first low noise amplifier, and a third selection terminal connected to an output terminal of the first power amplifier to a common terminal connected to the first RF terminal.

The second front-end module may include: a second power amplifier disposed on the fourth signal path and configured to amplify the second wireless LAN Tx signal from the duplexer; a second low noise amplifier disposed on the fifth signal path and configured to amplify the second wireless LAN Rx signal using the second RF terminal to provide the amplified second wireless LAN Rx signal to the third RF pin; and a second switch circuit configured to selectively connect one of a first selection terminal connected to an output terminal of the second low noise amplifier and a second selection terminal connected to an input terminal of the second power amplifier to a common terminal connected to the second RF terminal.

In another general aspect, a communications apparatus includes: an integrated chip (IC) including a first radio frequency (RF) pin configured to execute wireless transmission (Tx) and reception (Rx), and a first wireless local area network (LAN) Rx, a second RF pin configured to execute a first wireless LAN Tx and a second wireless LAN Tx, and a third RF pin configured to execute a second wireless LAN Rx; a first signal path, for the wireless Tx and Rx, disposed between the first RF pin and a first RF terminal; a second signal path, for the first wireless LAN Rx, disposed between the first RF pin and the first RF terminal; a third signal path, for the first wireless LAN Tx, disposed between the first RF pin and the first RF terminal; a fourth signal path, for the second wireless LAN Tx, disposed between the third RF pin and a second RF terminal; a fifth signal path, for the second wireless LAN Rx, disposed between the third RF pin and a second RF terminal; and a duplexer configured to provide a first wireless LAN Tx signal to the first RF terminal through the second RF pin, and provide a second wireless LAN Tx signal to the second RF terminal through the second RF pin.

The communications apparatus may further include a switch IC configured to selectively connect the first RF pin to one of the first signal path and the second signal path, in response to a control signal.

The communications apparatus may further include: a first switch circuit configured to selectively connect one of the first signal path, the second signal path, and the third signal path to the first RF terminal; and a second switch circuit configured to selectively connect one of the fourth signal path and the fifth signal path to the second RF terminal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments of the disclosure will now be described in detail with reference to the accompanying drawings.

Figure 1:
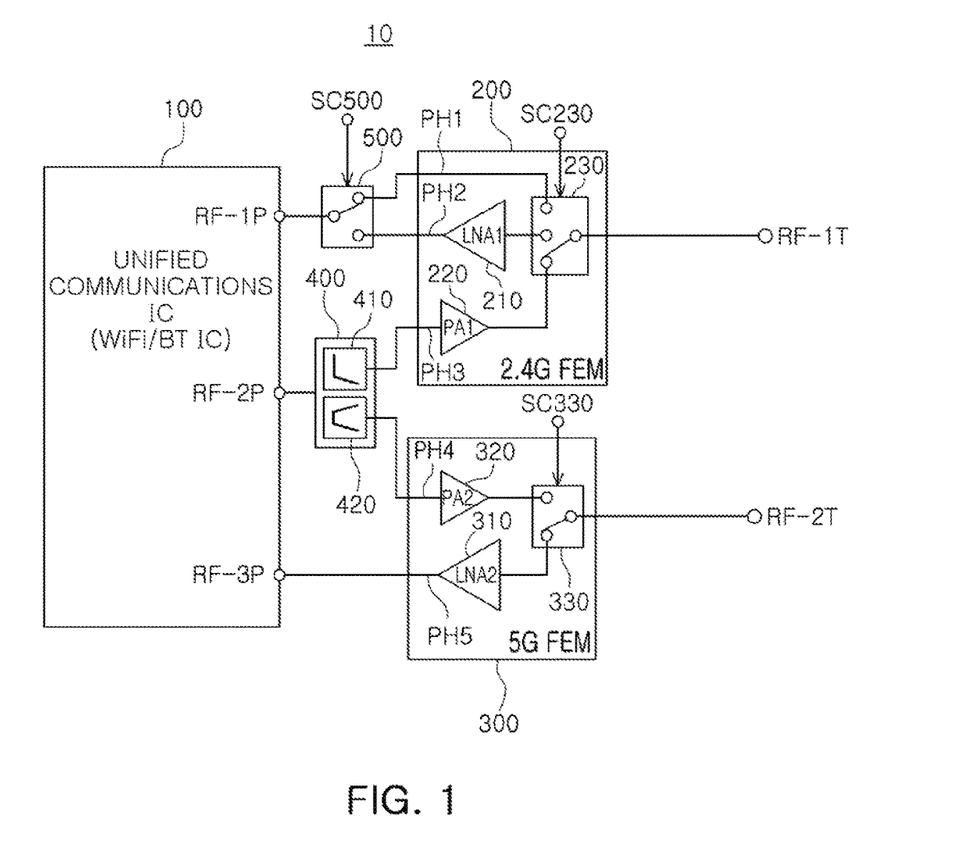
FIG. 1 is a diagram illustrating a unified communications apparatus, according to an embodiment.
Figure 2:
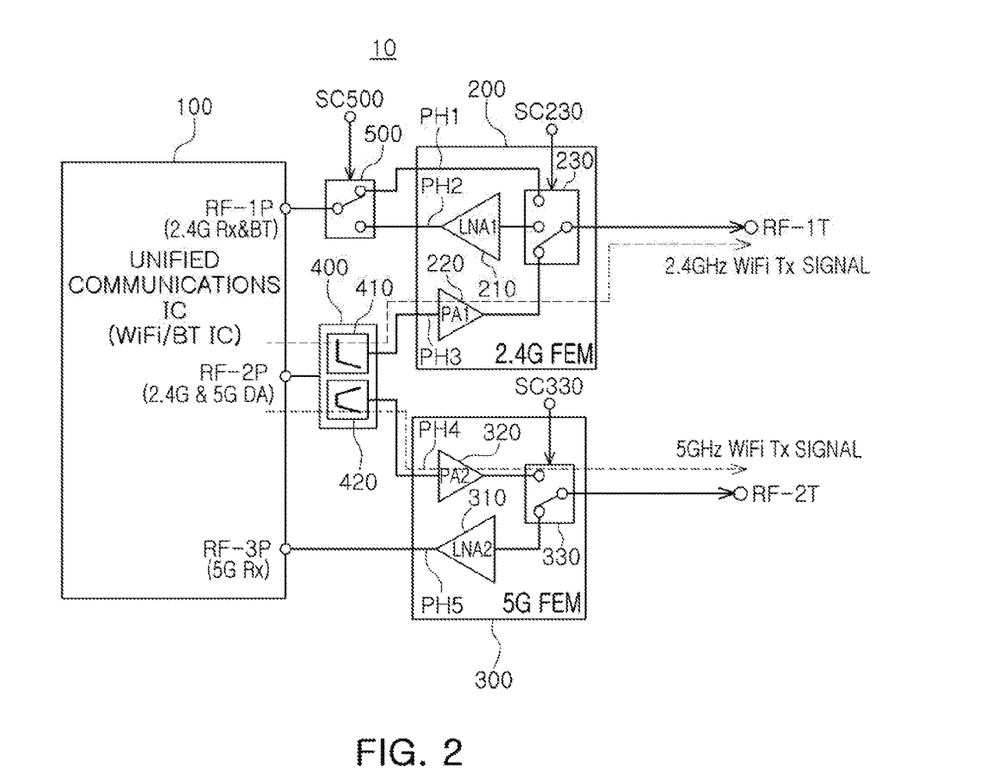
FIG. 2 is a diagram illustrating an example operation of the unified communications apparatus of FIG. 1.

FIG. 1 is a diagram illustrating a unified communications apparatus 10, according to an embodiment. FIG. 2 is a diagram illustrating an example operation of the unified communications apparatus 10. Referring to FIGS. 1 and 2, the unified communications apparatus 10 includes a unified communications IC 100, a first front-end module 200, a second front-end module 300, a duplexer 400, and a switch IC 500.

The unified communications IC 100 includes a first RF pin RF-1P for Bluetooth™ Tx/Rx and a first wireless LAN Rx, a second RF pin RF-2P for a first wireless LAN Tx and a second wireless LAN Tx, and a third RF pin RF-3P for a second wireless LAN Rx. As an example, the unified communications IC 100 is an integrated circuit supporting wireless LAN communications and Bluetooth (BT) communications to be operated simultaneously in a concurrent manner. The wireless LAN communications may be Wi-Fi communications, but are not limited thereto.

The first front-end module 200 is connected between the unified communications IC 100 and a first RF terminal (RF-1T) to provide a first signal path PH1 for Bluetooth™ between the first RF pin RF-1P of the unified communications IC 100 and the first RF terminal RF-1T, a second signal path PH2 for the first wireless LAN Rx between the first RF pin RF-1P of the unified communications IC 100 and the first RF terminal RF-1T, and a third signal path PH3 for the first wireless LAN Tx between the second RF pin RF-2P of the unified communications IC 100 and the first RF terminal RF-1T.

The second front-end module 300 is connected between the unified communications IC 100 and a second RF terminal (RF-2T) to provide a fourth signal path PH4 for the second wireless LAN Tx between the second RF pin RF-2P of the unified communications IC 100 and the second RF terminal RF-2T, and a fifth signal path PH5 for the second wireless LAN Rx between the third RF pin RF-3P of the unified communications IC 100 and the second RF terminal RF-2T.

The duplexer 400 separates a first wireless LAN Tx signal and a second wireless LAN Tx signal provided through the second RF pin RF-2P of the unified communications IC 100 from each other, and provides the separated signals to the first front-end module 200 and the second front-end module 300, respectively.

As an example, the duplexer 400 includes a first filter 410 and a second filter 420 for separating the first wireless LAN Tx signal and the second wireless LAN Tx signal from each other. The first filter 410 is connected between the second RF pin RF-2P of the unified communications IC 100 and the third signal path PH3 to pass the first wireless LAN Tx signal from the second RF pin RF-2P and to transmit the first wireless LAN Tx signal to the third signal path PH3. The second filter 420 is connected between the second RF pin RF-2P of the unified communications IC 100 and the fourth signal path PH4 to pass the second wireless LAN Tx signal from the second RF pin RF-2P and to transmit the second wireless LAN Tx signal to the fourth signal path PH4.

The switch IC 500 connects the first RF pin RF-1P of the unified communications IC 100 to one of the first signal path PH1 for Bluetooth communications and the second signal path PH2 for the first wireless LAN Rx, in response to a control signal SC500.

As an example, the first front-end module 200 includes a first low noise amplifier 210, a first power amplifier 220, and a first switch circuit 230.

The first switch circuit 230 includes a common terminal connected to the first RF terminal RF-1T, a first selection terminal connected to the first signal path PH1, a second selection terminal connected to the second signal path PH2 including the first low noise amplifier 210, and a third selection terminal connected to the third signal path PH3 including the first power amplifier 220. The first switch circuit 230 connects the common terminal of the first switch circuit 230 to one of the first selection terminal, the second selection terminal and the third selection terminal of the first switch circuit 230, in response to a control signal SC230.

The first low noise amplifier 210, which is disposed on the second signal path PH2, amplifies the first wireless LAN Rx signal from the first switch circuit 230 to transmit the amplified first wireless LAN Rx signal to the switch IC 500 through the second signal path PH2.

The first power amplifier 220, which is disposed on the third signal path PH3, amplifies the first wireless LAN Tx signal from the first filter 410 of the duplexer 400 to transmit the amplified first wireless LAN Tx signal to the first switch circuit 230 through the third signal path PH3.

In addition, the second front-end module 300 includes, for example, a second low noise amplifier 310, a second power amplifier 320, and a second switch circuit 330.

The second switch circuit 330 includes a common terminal connected to the second RF terminal RF-2T, a first selection terminal connected to the fourth signal path PH4 including the second power amplifier 320, and a second selection terminal connected to the fifth signal path PH5 including the second low noise amplifier 310. In this case, the second switch circuit 330 connects the common terminal of the second switch circuit 330 to one of the first selection terminal and the second selection terminal of the second switch circuit 330, in response to a control signal SC330.

The second power amplifier 320, which is disposed on the fourth signal path PH4, amplifies the second wireless LAN Tx signal from the second filter 420 of the duplexer 400 to transmit the amplified second wireless LAN Tx signal to the second switch circuit 330 through the fourth signal path PH4.

The second low noise amplifier 310, which is disposed on the fifth signal path PH5, amplifies the second wireless LAN Rx signal from the second switch circuit 330 to transmit the amplified second wireless LAN Rx signal to the third RF pin RF-3P of the unified communications IC 100 through the fifth signal path PH5.

As an example, the control signals SC500, SC230, and SC330, which are control signals which are preset to perform the corresponding communications, may be provided from the unified communications IC 100, or may be provided from a circuit that is separate from the unified communications IC 100.

In addition, the unified communications apparatus 10 may be implemented in a module, but is not limited thereto.

An operation in the unified communications apparatus 10 of transmitting the first wireless LAN Tx signal and the second wireless LAN Tx signal through the duplexer 400 will be described with reference to FIG. 2. In the description provided with reference to FIG. 2, descriptions overlapping the description made with reference to FIG. 1 may be omitted in the interest of conciseness.

Referring to FIG. 2, first, the first wireless LAN Tx signal is transmitted to the first power amplifier 220 of the first front-end module 200 through the first filter 410 of the duplexer 400, and the first wireless LAN Tx signal amplified by the first power amplifier 220 is transmitted to the first RF terminal RF-1T through the first switch circuit 230.

Next, the second wireless LAN Tx signal is transmitted to the second power amplifier 320 of the second front-end module 300 through the second filter 420 of the duplexer 400, and the second wireless LAN Tx signal amplified by the second power amplifier 320 is transmitted to the second RF terminal RF-2T through the second switch circuit 330.

The first front-end module 200 amplifies the first wireless LAN Tx signal from the duplexer 400 through the third signal path PH3 and provides the amplified first wireless LAN Tx signal to the first RF terminal RF-1T. As an example, the first wireless LAN Tx signal is a Wi-Fi 2.4 GHz Tx signal.

In addition, at the same time, the second front-end module 300 amplifies the second wireless LAN Tx signal from the duplexer 400 through the fourth signal path PH4 and provides the amplified second wireless LAN Tx signal to the second RF terminal RF-2T. As an example, the second wireless LAN Tx signal is a Wi-Fi 5 GHz Tx signal.

Figure 3:
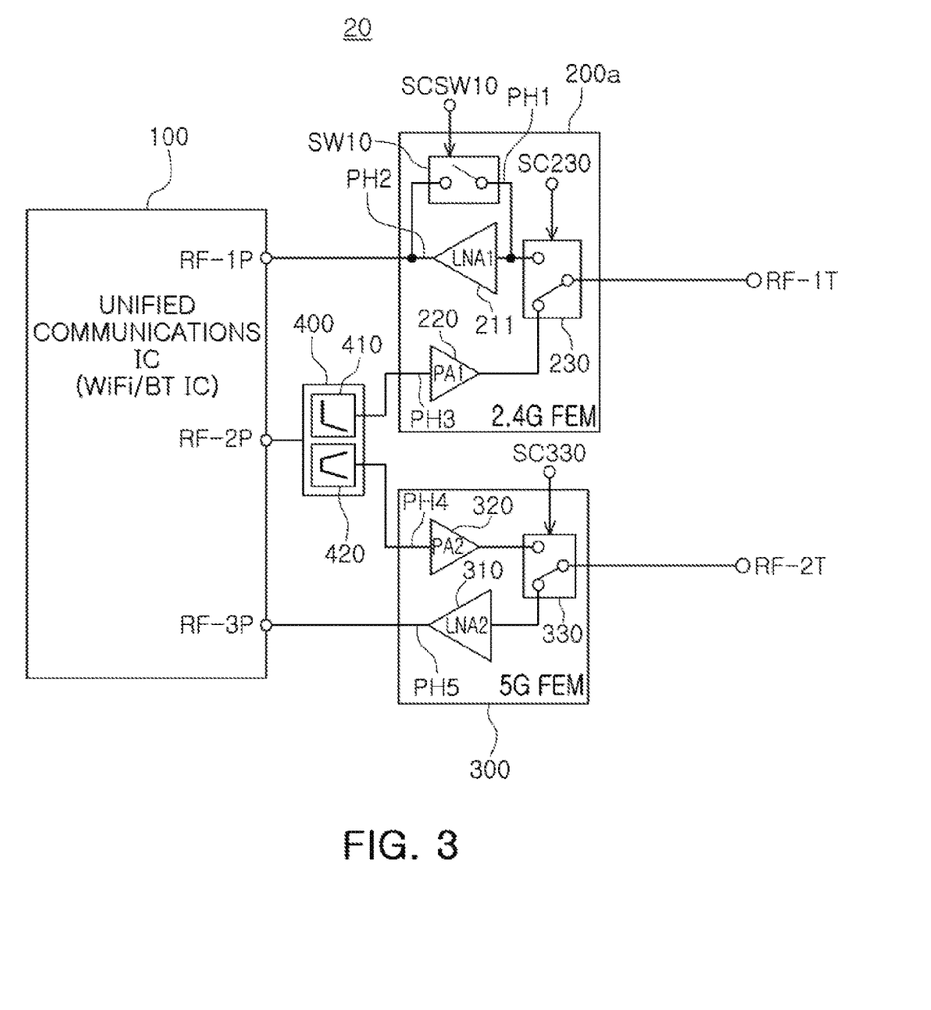
FIG. 3 is a diagram illustrating a unified communications apparatus, according to another embodiment.
Figure 4:
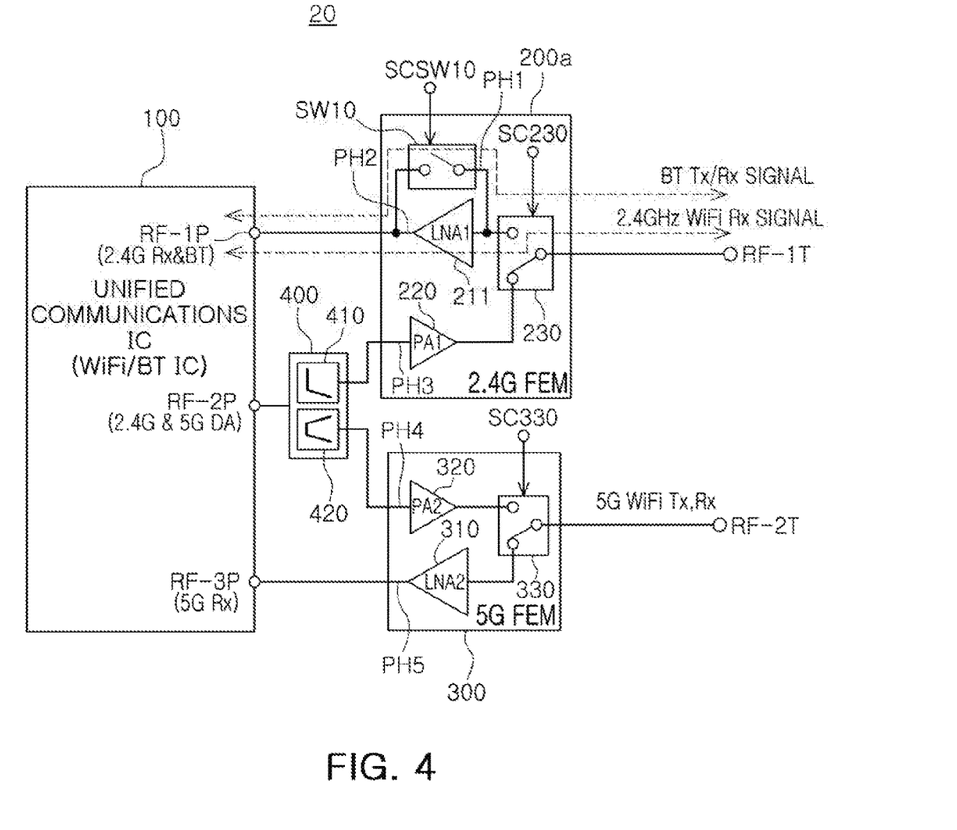
FIG. 4 is a diagram illustrating an example operation of the unified communications apparatus of FIG. 3.

FIG. 3 is a diagram illustrating a unified communications apparatus 20, according to another embodiment. FIG. 4 is a diagram illustrating an operation of the unified communications apparatus 20.

Referring to FIGS. 3 and 4, the unified communications apparatus 20 includes the unified communications IC 100, a first front-end module 200*a*, the second front-end module 300, and the duplexer 400.

In the description of the unified communications IC 100, the first front-end module 200*a*, the second front-end module 300, and the duplexer 400 illustrated in FIGS. 3 and 4, the same contents as those described with reference to FIGS. 1 and 2 may be omitted. Accordingly, only the first front-end module 200*a*, which is distinguished from the front end module 200 illustrated in FIGS. 1 and 2, will be described with reference to FIGS. 3 and 4.

The first front-end module 200 includes the first low noise amplifier 211, a first switch SW10, the first power amplifier 220, and the first switch circuit 230.

The first switch circuit 230 connects one of the first selection terminal connected to a connection node between the first signal path PH1 and the second signal path PH2, and the second selection terminal connected to an output terminal of the first power amplifier 220 to the common terminal connected to the first RF terminal RF-1T.

The first low noise amplifier 211, which is disposed on the second signal path PH2, amplifies the first wireless LAN Rx signal from the first switch circuit 230 to provide the amplified first wireless LAN Rx signal to the first RF pin RF-1P of the unified communications IC 100.

The first switch SW10, which is disposed in parallel with the first low noise amplifier 211, is connected between an input terminal and an output terminal of the first low noise amplifier 211 to provide the first signal path PH1 for Bluetooth™ Tx/Rx in an ON state. As an example, when the first switch SW10 is switched to the ON state in response to a control signal SCSW10, the first switch SW10 forms the first signal path PH1 for Bluetooth™ Tx/Rx between the first RF pin RF-1P of the unified communications IC 100 and the first selection terminal of the first switch SW10 to transmit the Bluetooth™ Tx/Rx signal through the first signal path PH1.

The first power amplifier 220, which is disposed on the third signal path PH3, amplifies the first wireless LAN Tx signal from the duplexer 400 to transmit the amplified first wireless LAN Tx signal to the second selection terminal of the first switch SW10.

An operation of transmitting the Bluetooth™ Tx/Rx signal and the first wireless LAN Rx signal from the first front-end module 200*a* will be described with reference to FIG. 4. In the description provided with reference to FIG. 4, descriptions overlapping the description made with reference to FIGS. 1 through 3 may be omitted.

Referring to FIG. 4, first, when the first switch SW10 is switched to the ON state by the control signal SCSW10, and the common terminal of the first switch circuit 230 and the first selection terminal are connected to each other by the control signal SC230, the Bluetooth™ Rx signal is transmitted to the first RF pin RF-1P of the unified communications IC 100 through the first switch circuit 230 and the first switch SW10 from the first RF terminal RF-1T, and the Bluetooth™ Tx signal is transmitted to the first RF terminal RF-1T through the first switch SW10 and the first switch circuit 230 from the first RF pin RF-1P of the unified communications IC 100.

Next, when the first switch SW10 is switched to an OFF state by the control signal SCSW10, and the common terminal of the first switch circuit 230 and the first selection terminal are connected to each other by the control signal SC230, the first wireless LAN Rx signal is transmitted to the first RF pin RF-1P of the unified communications IC 100 through the first switch circuit 230 and the first low noise amplifier 211 from the first RF terminal RF-1T.

The first low noise amplifier 211 amplifies the first wireless LAN Rx signal.

The first filter 410 of the duplexer 400 described above may be implemented in either one or both of a low pass filter and a band pass filter that passes the first wireless LAN Tx signal.

The second filter 420 of the duplexer 400 may be implemented in either one or both of a high pass filter and a band pass filter that passes the second wireless LAN Tx signal.

Duplexers 400a and 400b, according to embodiments, will be described with reference to FIGS. 5 and 6, respectively. Duplexers 400a and 400b are variations of the duplexer 400 illustrated in FIGS. 1-4. It is to be understood that embodiments other than those illustrated in FIGS. 5 and 6 are possible.

Figure 5:
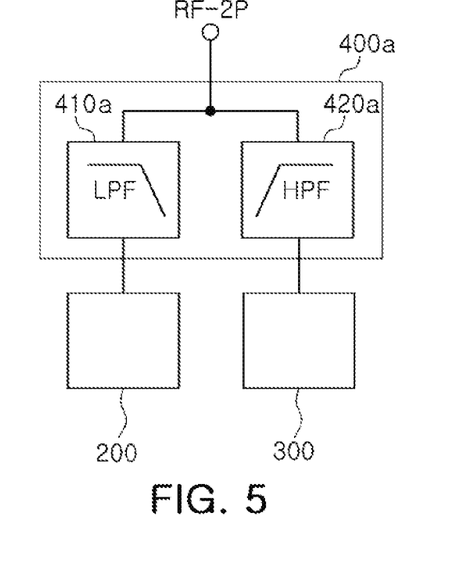
FIG. 5 is a diagram illustrating a duplexer, according to an embodiment.

Referring to FIG. 5, a first filter 410a of the duplexer 400a is implemented in a low pass filter (LPF), and a second filter 420a of the duplexer 400a is implemented in a high pass filter (HPF). As an example, when a frequency of the first wireless LAN Tx signal is 2.4 GHz, and a frequency of the second wireless LAN Tx signal is 5 GHz, the first wireless LAN 2.4 GHz Tx signal is low-passed by the first filter 410a, and the second wireless LAN 5 GHz Tx signal is high-passed by the second filter 420a.

Figure 6:
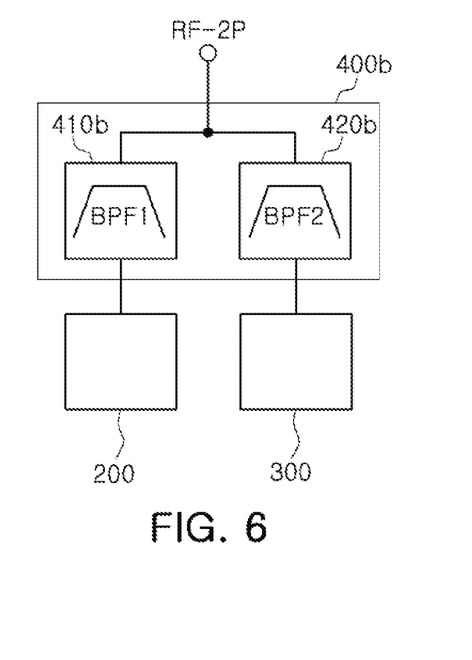
FIG. 6 is a diagram illustrating a duplexer, according to another embodiment.

Referring to FIG. 6, the first filter 410b of the duplexer 400b is implemented in a first band pass filter (BPF1) that passes the frequency of the first wireless LAN Tx signal, and the second filter 420b of the duplexer 400b is implemented in a second band pass filter (BPF2) that passes the frequency of the second wireless LAN Tx signal. As an example, when the frequency of the first wireless LAN Tx signal is 2.4 GHz, and the frequency of the second wireless LAN Tx signal is 5 GHz, the first wireless LAN 2.4 GHz Tx signal is band-passed by the first filter 410b, and the second wireless LAN 5 GHz Tx signal is band-passed by the second filter 420b.

As set forth above, according to the embodiments disclosed herein, in a unified communications apparatus capable of supporting both wireless LAN (e.g., Wi-Fi) communications and Bluetooth™ communications, and simultaneously supporting the first wireless LAN communications and the second wireless LAN communications having different frequency bands, an occupied area may be reduced and complexity of a circuit design may be reduced by reducing the number of independent switch ICs used.

The unified communications IC 100, the duplexer 400 and the first and second filters 410, 420 in FIGS. 1-4, the first front-end module 200 in FIGS. 1-2 and 5-6, the second front-end module 300 in FIGS. 1-6, the first front-end module 200a in FIGS. 3-4, the duplexer 400a and the first and second filters 410a, 410b in FIG. 5, and the duplexer 410b and the first and second filters 410b, 420b in FIG. 6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components as described above may be written as computer programs, code segments, instructions or any combination thereof, for individually or collectively instructing or configuring the one or more processors or computers to operate as a machine or special-purpose computer to perform the operations that are performed by the hardware components as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components as described above.

The instructions or software to control computing hardware, for example, one or more processors or computers, to implement the hardware components as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A communications apparatus, comprising:
   an integrated chip (IC) comprising
      a first radio frequency (RF) pin configured to execute wireless transmission (Tx) and reception (Rx), and a first wireless local area network (LAN) Rx,
      a second RF pin configured to execute a first wireless LAN Tx and a second wireless LAN Tx, and
      a third RF pin configured to execute a second wireless LAN Rx;
   a first front-end module connected between the first RF pin and a first RF terminal to provide a first signal path for the wireless Tx and Rx, a second signal path for the first wireless LAN Rx, and a third signal path for the first wireless LAN Tx;
   a second front-end module connected between the third RF pin and a second RF terminal to provide a fourth signal path for the second wireless LAN Tx and a fifth signal path for the second wireless LAN Rx; and
   a duplexer configured to provide a first wireless LAN Tx signal to the first front-end module through the second RF pin, and provide a second wireless LAN Tx signal to the second front-end module through the second RF pin.

2. The communications apparatus of claim 1, further comprising:
   a switch IC configured to selectively connect the first RF pin to one of the first signal path and the second signal path, in response to a control signal.

3. The communications apparatus of claim 2, wherein the first front-end module comprises:
   a first low noise amplifier disposed on the second signal path and configured to amplify a first wireless LAN Rx signal to provide the amplified first wireless LAN Rx signal to the switch IC;
   a first power amplifier, disposed on the third signal path, and configured to amplify the first wireless LAN Tx signal provided by the duplexer; and
   a first switch circuit configured to selectively connect one of a first selection terminal connected to the first signal path, a second selection terminal connected to an input terminal of the first low noise amplifier, and a third selection terminal connected to an output terminal of the first power amplifier to a common terminal connected to the first RF terminal.

4. The communications apparatus of claim 2, wherein the second front-end module comprises:
   a second low noise amplifier disposed on the fifth signal path and configured to amplify the second wireless LAN Tx signal from the duplexer;
   a second power amplifier disposed on the fourth signal path and configured to amplify the second wireless LAN Rx signal using the second RF terminal to provide the amplified second wireless LAN Rx signal to the third RF pin; and
   a second switch circuit configured to selectively connect one of a first selection terminal connected to an output terminal of the second low noise amplifier and a second selection terminal connected to an input terminal of the second power amplifier to a common terminal connected to the second RF terminal.

5. The communications apparatus of claim 1, wherein the first front-end module comprises:
   a first low noise amplifier disposed on the second signal path and configured to amplify a first wireless LAN Rx signal to provide the amplified first wireless LAN Rx signal to the first RF pin;
   a first switch disposed in parallel with the first low noise amplifier and connected between an input terminal and an output terminal of the first low noise amplifier to provide the first signal path for the wireless Tx and Rx in an ON state;
   a first power amplifier disposed on the third signal path and configured to amplify the first wireless LAN Tx signal from the duplexer; and
   a first switch circuit configured to selectively connect one of a first selection terminal connected to a connection node between the first signal path and the second signal path, and a second selection terminal connected to an output terminal of the first power amplifier to a common terminal connected to the first RF terminal.

6. The communications apparatus of claim 5, wherein the second front-end module comprises:
   a second power amplifier disposed on the fourth signal path and configured to amplify the second wireless LAN Tx signal from the duplexer;
   a second low noise amplifier disposed on the fifth signal path and configured to amplify the second wireless LAN Rx signal using the second RF terminal to provide the amplified second wireless LAN Rx signal to the third RF pin; and
   a second switch circuit configured selectively connect one of a first selection terminal connected to an output terminal of the second low noise amplifier and a second selection terminal connected to an input terminal of the second power amplifier to a common terminal connected to the second RF terminal.

7. A communications apparatus, comprising:
   an integrated chip (IC) comprising
      a first radio frequency (RF) pin configured to execute wireless transmission (Tx) and reception (Rx), and a first wireless LAN Rx, a second RF pin configured to execute a first wireless LAN Tx and a second wireless LAN Tx, and
a third RF pin configured to execute a second wireless LAN Rx;
a first front-end module configured to provide, between the first RF pin and a first RF terminal, a first signal path for the wireless Tx and Rx, a second signal path for amplifying a first wireless LAN Rx signal from the first RF terminal to provide the amplified first wireless LAN Rx signal to the first RF pin, and a third signal path for amplifying a first wireless LAN Tx signal;
a second front-end module connected between the third RF pin and a second RF terminal to provide a fourth signal path for the second wireless LAN Tx and a fifth signal path to amplify a second wireless LAN Rx signal from the second RF terminal to provide the amplified second wireless LAN Rx signal to the third RF pin; and
a duplexer configured to provide the first wireless LAN Tx signal to the first front-end module through the second RF pin, and provide the second wireless LAN Tx signal to the second front-end module through the second RF pin,
wherein the first front-end module is configured to amplify the first wireless LAN Tx signal provided by the duplexer through the third signal path to provide the amplified first wireless LAN Tx signal to the first RF terminal, and
the second front-end module is configured to amplify the second wireless LAN Tx signal from the duplexer through the fourth signal path to provide the amplified second wireless LAN Tx signal to the second RF terminal.

8. The communications apparatus of claim 7, wherein the first front-end module comprises:
a first low noise amplifier disposed on the second signal path and configured to amplify a first wireless LAN Rx signal to provide the amplified first wireless LAN Rx signal to the first RF pin;
a first switch connected to the first low noise amplifier in parallel between an input terminal and an output terminal of the first low noise amplifier to provide the first signal path for the wireless Tx and Rx in an ON state;
a first power amplifier, disposed on the third signal path and configured to amplify the first wireless LAN Tx signal from the duplexer; and
a first switch circuit configured to selectively connect one of a first selection terminal connected to the first signal path, a second selection terminal connected to an input terminal of the first low noise amplifier, and a third selection terminal connected to an output terminal of the first power amplifier to a common terminal connected to the first RF terminal.

9. The communications apparatus of claim 7, wherein the second front-end module comprises:

a second power amplifier disposed on the fourth signal path and configured to amplify the second wireless LAN Tx signal from the duplexer;
a second low noise amplifier disposed on the fifth signal path and configured to amplify the second wireless LAN Rx signal using the second RF terminal to provide the amplified second wireless LAN Rx signal to the third RF pin; and
a second switch circuit configured to selectively connect one of a first selection terminal connected to an output terminal of the second low noise amplifier and a second selection terminal connected to an input terminal of the second power amplifier to a common terminal connected to the second RF terminal.

10. A communications apparatus comprising:
an integrated chip (IC) comprising
a first radio frequency (RF) pin configured to execute wireless transmission (Tx) and reception (Rx), and a first wireless local area network (LAN) Rx,
a second RF pin configured to execute a first wireless LAN Tx and a second wireless LAN Tx, and
a third RF pin configured to execute a second wireless LAN Rx;
a first signal path, for the wireless Tx and Rx, disposed between the first RF pin and a first RF terminal;
a second signal path, for the first wireless LAN Rx, disposed between the first RF pin and the first RF terminal;
a third signal path, for the first wireless LAN Tx, disposed between the first RF pin and the first RF terminal;
a fourth signal path, for the second wireless LAN Tx, disposed between the third RF pin and a second RF terminal;
a fifth signal path, for the second wireless LAN Rx, disposed between the third RF pin and a second RF terminal; and
a duplexer configured to provide a first wireless LAN Tx signal to the first RF terminal through the second RF pin, and provide a second wireless LAN Tx signal to the second HF terminal through the second RF pin.

11. The communications apparatus of claim 10, further comprising:
a switch IC configured to selectively connect the first RF pin to one of the first signal path and the second signal path, in response to a control signal.

12. The communications apparatus of claim 11, further comprising:
a first switch circuit configured to selectively connect one of the first signal path, the second signal path, and the third signal path to the first RF terminal; and
a second switch circuit configured to selectively connect one of the fourth signal path and the fifth signal path to the second RF terminal.

* * * * *